(12) United States Patent
Miyazawa et al.

(10) Patent No.: US 11,809,762 B2
(45) Date of Patent: Nov. 7, 2023

(54) INFORMATION PROCESSING SYSTEM AND MANAGEMENT APPARATUS

(71) Applicant: SEIKO EPSON CORPORATION, Tokyo (JP)

(72) Inventors: Shigeyoshi Miyazawa, Matsumoto (JP); Takaaki Chikushi, Suginami-ku (JP); Hiroyuki Kuramoto, Shiojiri (JP); Haruo Inoue, Matsumoto (JP); Koji Nakashima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/570,752

(22) Filed: Jan. 7, 2022

(65) Prior Publication Data

US 2022/0222020 A1   Jul. 14, 2022

(30) Foreign Application Priority Data

Jan. 14, 2021   (JP) ................................. 2021-004178

(51) Int. Cl.
*G06F 3/12* (2006.01)

(52) U.S. Cl.
CPC .......... *G06F 3/1229* (2013.01); *G06F 3/1207* (2013.01); *G06F 3/1219* (2013.01); *G06F 3/1288* (2013.01)

(58) Field of Classification Search
None
See application file for complete search history.

(56) References Cited

U.S. PATENT DOCUMENTS

| 2013/0222827 A1* | 8/2013 | Watanabe | G06F 3/122 358/1.14 |
| 2015/0029536 A1* | 1/2015 | Suzuki | G06F 21/121 358/1.14 |
| 2015/0293727 A1* | 10/2015 | Miyazawa | G06Q 30/0241 358/1.15 |

FOREIGN PATENT DOCUMENTS

| JP | 2009193520 A | | 8/2009 |
| JP | 2009193529 A | * | 8/2009 |
| JP | 2015201133 A | | 11/2015 |
| WO | WO-2022072958 A1 | * | 4/2022 |

* cited by examiner

*Primary Examiner* — Fan Zhang
(74) *Attorney, Agent, or Firm* — CHIP LAW GROUP

(57) ABSTRACT

An information processing system includes a company complex machine to be a target for a printing service, a home complex machine not to be the target for the printing service, a number of prints management server configured to manage the number of printable sheets to be printed by the company complex machine, and when printing is performed by the home complex machine, a home print management server configured to perform reduction processing for reducing the number of printable sheets managed by the number of prints management server and point providing processing for providing points in accordance with printing results produced by the home complex machine to an employee.

7 Claims, 9 Drawing Sheets

FIG. 4

| CONTRACTOR ID | COMPANY COMPLEX MACHINE ID | COMPLEX MACHINE PRINTABLE NUMBER INFORMATION | CONTRACTOR PRINTABLE NUMBER INFORMATION |
|---|---|---|---|
| KYO303 | FG0001 | 1000 SHEETS | 3459 SHEETS |
| | FG0004 | 580 SHEETS | |
| | ⋮ | ⋮ | |

| USER ID (514) | PASSWORD (9111) |
|---|---|
| US0001 | 1749572 |
| US0002 | 6926759 |
| : | : |

| CONTRACTOR ID (6111) | USER ID (514) | HOME COMPLEX MACHINE ID (211) |
|---|---|---|
| KY0303 | US0001 | JFG0001 |
| | US0002 | JFG0002 |
| | : | : |

INFORMATION PROCESSING SYSTEM AND MANAGEMENT APPARATUS

The present application is based on, and claims priority from JP Application Serial Number 2021-004178, filed Jan. 14, 2021, the disclosure of which is hereby incorporated by reference herein in its entirety.

BACKGROUND

1. Technical Field

The present disclosure relates to an information processing system and a management apparatus.

2. Related Art

Printing services that provide printers and calculate printing costs related to the printing performed by the provided printers are known. JP-A-2009-193520 discloses a system that provides a service to calculate the total charging amount in accordance with the number of printed sheets output for each department of an organization based on a gradually decreasing charging system in which the printing unit cost gradually decreases as the number of printed sheets increases.

For example, when a system like the one disclosed in JP-A-2009-193520 is employed in an office, a contractor, such as a company, or the like that signed a use contract for a printing service bears the printing costs at the office. Accordingly, a user of the system, who is an employee of the company, or the like, does not bear the printing costs when the user performs printing by using a printer provided in the office. However, when the user performs printing by using a personal printer when, for example, working at home, the user unnecessarily bears the printing costs related to the printing.

SUMMARY

According to an aspect of the present disclosure, there is provided an information processing system for providing a printing service using a target printer, including: a first printer to be a target for the printing service; a second printer not to be the target for the printing service; a first management apparatus configured to manage a printable amount, the printable amount being an amount of prints printable by the first printer in the printing service; and when printing is performed by the second printer, a second management apparatus configured to perform reduction processing for reducing the printable amount managed by the first printer based on printing results of the second printer and point providing processing for providing points in accordance with printing results of the second printer to a user of the second printer.

According to another aspect of the present disclosure, there is provided, in a printing service using a target printer, a management apparatus communicable with a printable amount management apparatus managing a printable amount of a first printer to be a target of the printing service, the management apparatus including: when printing is performed by a second printer not to be the target for the printing service, a controller configured to perform reduction processing for reducing the printable amount managed by the printable amount management apparatus based on printing results of the second printer and point providing processing for providing points in accordance with printing results of the second printer to a user of the second printer.

BRIEF DESCRIPTION OF THE DRAWINGS

FIG. 4 is a diagram illustrating an example of a number of prints management DB.

FIG. 7 is a diagram illustrating an example of an authentication information management DB.

FIG. 8 is a diagram illustrating an example of a home print management DB.

DESCRIPTION OF EXEMPLARY EMBODIMENTS

Figure 1:
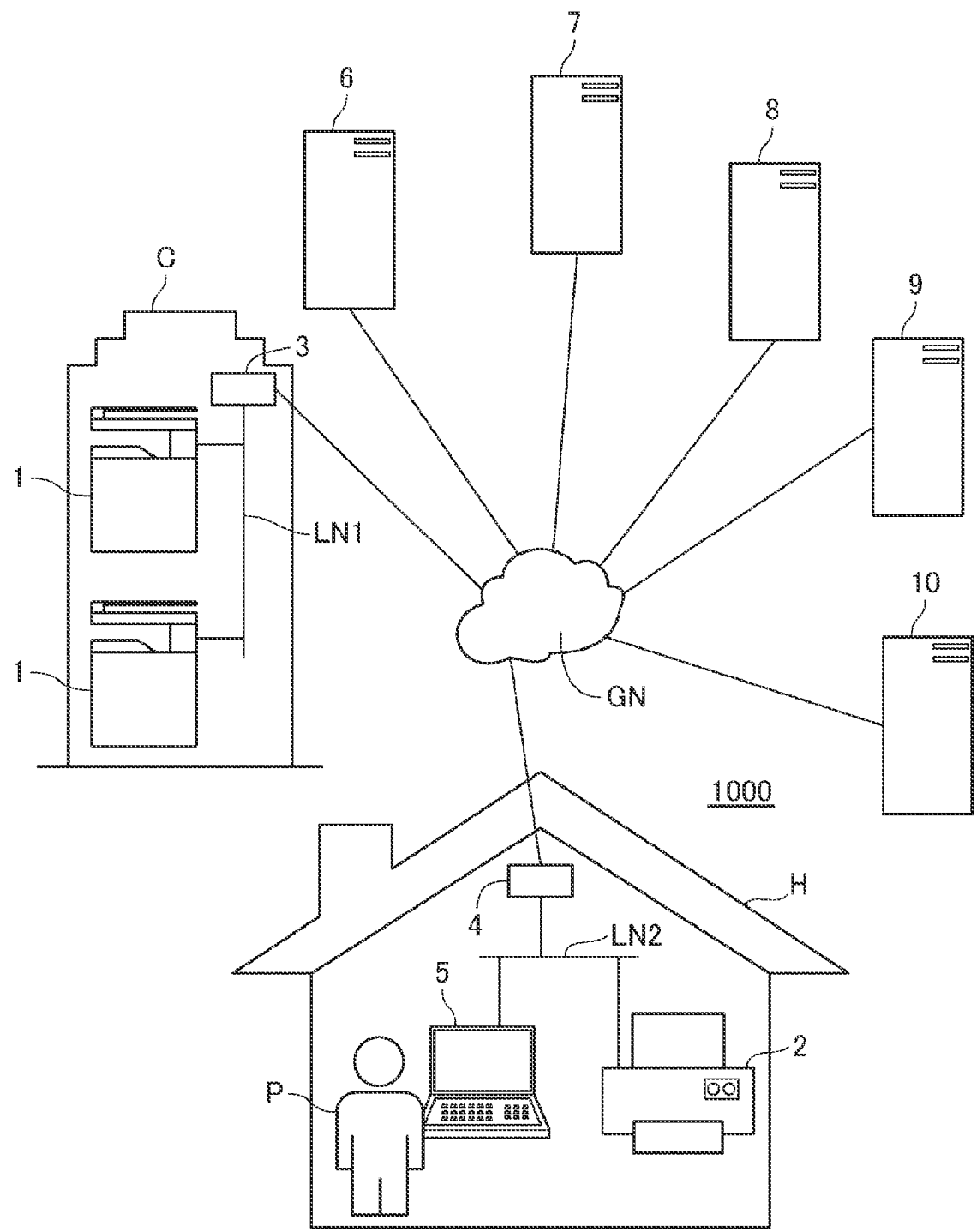
FIG. 1 is a diagram illustrating the configuration of an information processing system.

FIG. 1 is a diagram illustrating the configuration of an information processing system 1000.

The information processing system 1000 is a system that performs information processing concerning a company complex machine 1 and a home complex machine 2. The information processing system 1000 includes the company complex machine 1 and the home complex machine 2. The company complex machine 1 and the home complex machine 2 are each referred to as an MFP (multifunction peripheral) and are apparatuses configured to perform various kinds of processing, such as printing, scanning, and the like. The company complex machine 1 corresponds to an example of the first printer. The home complex machine 2 corresponds to an example of the second printer.

The company complex machine 1 is a complex machine that is provided by a service provider who provides a printing service to a company C who has signed a use contract of the printing service on lease or the like. The company complex machine 1 is disposed in, for example, an office of the company C. That is to say, the company complex machine 1 is a complex machine targeted for the printing service. The printing service is a service for using the targeted complex machine. Also, the printing service is a service in which a complex machine is provided to a contractor who has signed a use contract of a printing service, and the contractor is able to print a predetermined number of sheets by using the provided complex machine at a flat rate for a certain period. The contractor who has signed a use contract of the printing service pays the use fee of the printing service. In the present embodiment, the company C pays the use fee of the printing service as the contractor. The complex machine corresponds to an example of the printer.

The company complex machine 1 is connected to a local network LN1 disposed in the office and communicates with a device connected to a global network GN via a communication device 3 coupled to the local network LN1. The global network GN includes the Internet, a telephone network, and other communication networks. The communication device 3 is an interface device for connecting a device connected to the local network LN1 to the global network GN.

The home complex machine 2 is a complex machine disposed in a home H of an employee P of the company C. The home complex machine 2 is an apparatus owned by the employee P. The home complex machine 2 is not a complex machine provided by the service provider of the printing service. That is to say, the home complex machine 2 is a complex machine not targeted for the printing service. The employee P and the company C have an employment relationship. The employment relationship corresponds to an example of a predetermined relationship. The employee P corresponds to an example of the user of the second printer.

The home complex machine 2 is connected to a local network LN2 disposed in the home H and communicates with a device connected to the global network GN via a communication device 4 coupled to the local network LN2. The communication device 4 is an interface device for connecting a device connected to the local network LN2 to the global network GN.

The information processing system 1000 further includes a terminal apparatus 5, a number of prints management server 6, a content management server 7, a print server 8, a home print management server 9, and a point management server 10. The terminal apparatus 5 is a PC (personal computer). The terminal apparatus 5 illustrated in FIG. 1 is a laptop PC. However, the terminal apparatus 5 may be a desktop PC, a tablet PC, or a smartphone. The terminal apparatus 5 may be an apparatus owned by the employee P or rented from the company C.

The terminal apparatus 5 is connected to the local network LN2 and communicates with a device connected to the global network GN via the communication device 4 coupled to the local network LN2.

The number of prints management server 6 is a server apparatus that provides a printing service and manages the number of printed sheets of a complex machine provided to the contractor who has signed a use contract of a printing service. In the present embodiment, the number of prints management server 6 manages the number of printed sheets of the company complex machine 1. The number of prints management server 6 is connected to the global network GN and communicates with a device connected to the global network GN. The number of prints management server 6 corresponds to an example of the first management apparatus and the printable amount management apparatus.

The content management server 7 is a server apparatus that manages content. The content management server 7 according to the present embodiment manages content to be used by the employee P for business. The content management server 7 is connected to the global network GN and communicates with a device connected to the global network GN. The content management server 7 corresponds to an example of the third management apparatus.

The print server 8 is a server apparatus that causes the home complex machine 2 to perform printing. The print server 8 is connected to the global network GN and communicates with a device connected to the global network GN.

The home print management server 9 is a server apparatus that performs information processing concerning printing performed by the home complex machine 2. The home print management server 9 is connected to the global network GN and communicates with a device connected to the global network GN. The home print management server 9 corresponds to an example of the management apparatus and the second management apparatus.

The point management server 10 is a server apparatus that manages points that are provided to the employee P in accordance with the printing results of the home complex machine 2. The point management server 10 is connected to the global network GN and communicates with a device connected to the global network GN.

In this regard, in each figure, each of the number of prints management server 6, the content management server 7, the print server 8, the home print management server 9, and the point management server 10 is expressed by one block. However, this does not necessarily mean that each server apparatus is constituted by a single server apparatus. For example, each of the number of prints management server 6, the content management server 7, the print server 8, the home print management server 9, and the point management server 10 may include a plurality of server apparatuses having different processing contents. Also, in each figure, each of the number of prints management server 6, the content management server 7, the print server 8, the home print management server 9, and the point management server 10 is illustrated as a separate server apparatus. However, a plurality of server apparatuses of these server apparatuses may be configured as the same server apparatus.

Figure 2:
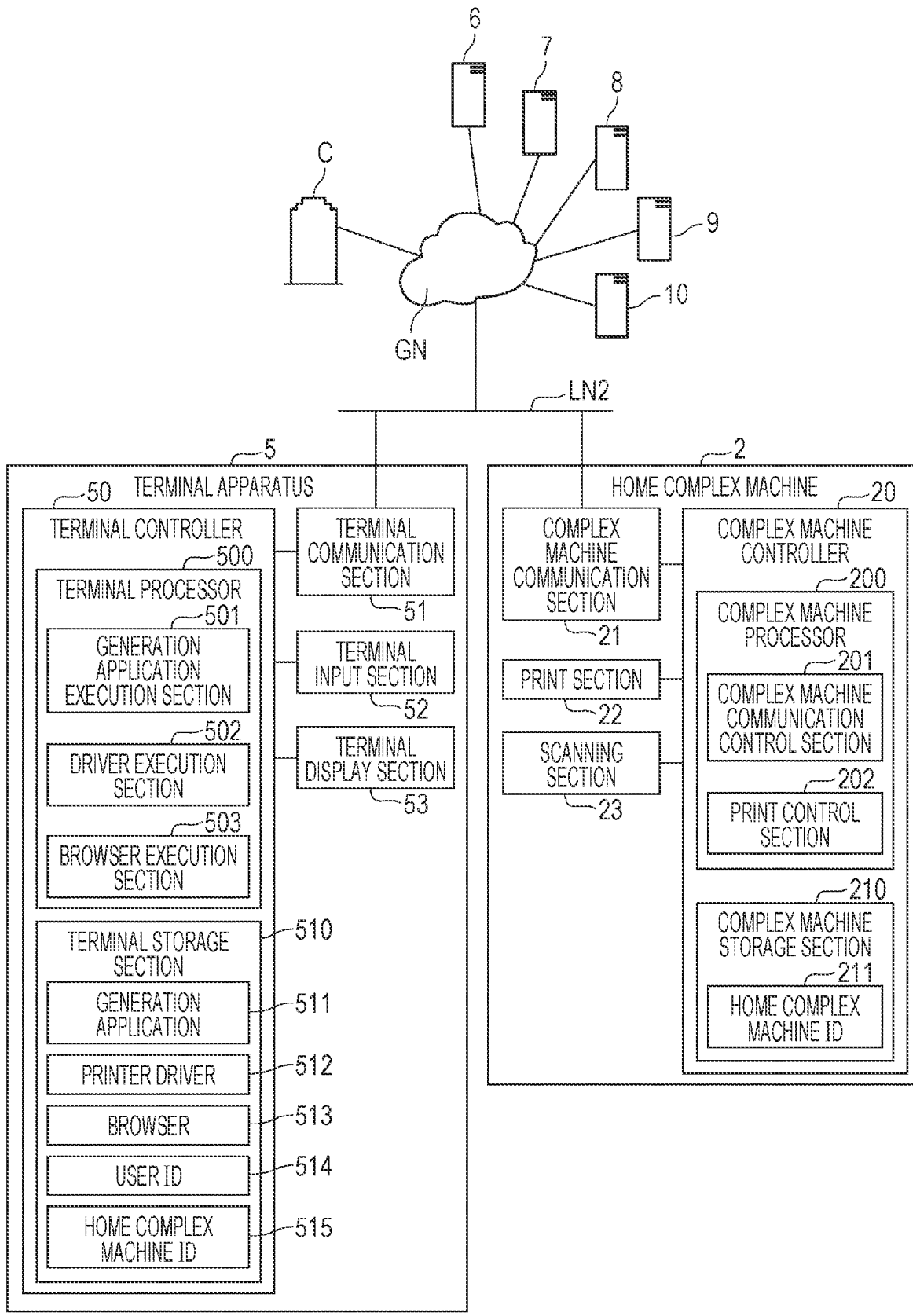
FIG. 2 is a diagram illustrating the configurations of a home complex machine and a terminal apparatus.

FIG. 2 is a diagram illustrating the configurations of the home complex machine 2 and the terminal apparatus 5. The home complex machine 2 includes a complex machine controller 20, a complex machine communication section 21, a print section 22, and a scanning section 23.

The complex machine controller 20 includes a complex machine processor 200, which is a processor that executes a program, such as a CPU (central processing unit) and an MPU (micro-processing unit) or the like, and includes a complex machine storage section 210. The complex machine controller 20 controls each section of the home complex machine 2 by causing the complex machine processor 200 to read a control program stored in the complex machine storage section 210 and execute the control program. The complex machine controller 20 functions as the complex machine communication control section 201 and the print control section 202 by causing the complex machine processor 200 to execute a control program stored in the complex machine storage section 210.

The complex machine storage section 210 includes a memory that stores a program to be executed by the complex machine processor 200 and data to be processed by the complex machine processor 200. The complex machine storage section 210 stores a control program to be executed by the complex machine processor 200, a home complex machine ID 211, which is the identification information of the home complex machine 2, and the various other kinds of data. The complex machine storage section 210 includes a nonvolatile storage area. Also, the complex machine storage section 210 may include a volatile storage area for forming a work area for the complex machine processor 200.

The complex machine communication section 21 is a communication interface including a wireless circuit, an antenna, and the like and communicates with the terminal apparatus 5 connected to the local network LN2 and a device connected to the global network GN in accordance with a predetermined communication standard. The communication standard of the complex machine communication section 21 may be a wireless communication standard or a wired communication standard.

The print section 22 includes components concerning printing, such as an ink jet head that discharges ink onto a print medium to form a dot, a carriage that operates the ink jet head in the scanning direction, a carriage drive motor that drives the carriage, a transport unit that transports the print medium, an ink supply unit that supplies ink to the ink jet head, and the like. The print section 22 discharges ink from a nozzle of the ink jet head to form a dot on the print surface of the print medium under the control of the complex machine controller 20 to perform printing on the print medium.

The scanning section 23 includes components concerning reading by a scanner that reads characters and images recorded on a document, and the like. The scanning section 23 reads, for example, recorded characters and images by radiating light emitted from a light source and outputs the image data obtained by reading to the complex machine controller 20. The complex machine controller 20 performs data processing, such as RGB conversion and compression processing, and the like on the image data input from the scanning section 23 to generate data in a predetermined format. The complex machine controller 20 stores the generated predetermined format data in the complex machine storage section 210 as read data.

The complex machine controller 20 functions as the complex machine communication control section 201 and the print control section 202.

The complex machine communication control section 201 communicates with the terminal apparatus 5 connected to the local network LN2 and with a device connected to the global network GN via the complex machine communication section 21.

The print control section 202 controls the print section 22 and performs printing on a print medium based on print data.

The terminal apparatus 5 includes a terminal controller 50, a terminal communication section 51, a terminal input section 52, and a terminal display section 53.

The terminal controller 50 includes a terminal processor 500, which is a processor that executes a program, such as a CPU, an MPU or the like, and a terminal storage section 510. The terminal controller 50 controls each section of the terminal apparatus 5 by causing the terminal processor 500 to read a control program stored in the terminal storage section 510 and execute the control program. The terminal controller 50 functions as a generation application execution section 501 by causing the terminal processor 500 to execute a generation application 511 stored in the terminal storage section 510. Also, the terminal controller 50 functions as a driver execution section 502 by causing the terminal processor 500 to execute a printer driver 512 stored in the terminal storage section 510. Also, the terminal controller 50 functions as a browser execution section 503 by causing the terminal processor 500 to execute a browser 513 stored in the terminal storage section 510.

The terminal storage section 510 includes a memory that stores a program to be executed by the terminal processor 500 and data processed by the terminal processor 500. The terminal storage section 510 stores a control program to be executed by the terminal processor 500, a generation application 511, a printer driver 512, a browser 513, a user ID 514, a home complex machine ID 515, which is the identification information of the home complex machine 2, and the various other kinds of data. The terminal storage section 510 has a nonvolatile storage area. Also, the terminal storage section 510 may have a volatile storage area and form a work area for the terminal processor 500.

The generation application 511 is an application program that generates a document and image data. The printer driver is a program that generates print data conforming to the command system of the home complex machine 2. The browser is a program for accessing a webpage provided by the content management server 7. The user ID 514 is the identification information that identifies an employee P who is a user of the home complex machine 2 in the information processing system 1000.

The terminal communication section 51 is a communication interface including a wireless circuit, an antenna, and the like and communicates with the home complex machine 2 connected to the local network LN2 and with a device connected to the global network GN in accordance with a predetermined communication standard. The communication standard of the terminal communication section 51 may be a wireless communication standard or a wired communication standard.

The terminal input section 52 is an input interface, coupled to an input mechanism, such as an operation switch disposed on the terminal apparatus 5, a panel having a touch input function, a mouse, a keyboard, or the like, which detects operation on the input mechanism performed by a user, and outputs a detection result to the terminal controller 50. The terminal controller 50 performs processing corresponding to the operation on the input mechanism based on input from the terminal input section 52.

The terminal display section 53 includes a display and displays information under the control of the terminal controller 50. The terminal display section 53 may be an external display disposed separately from the terminal apparatus 5.

The terminal controller 50 functions as the generation application execution section 501, the driver execution section 502, and the browser execution section 503.

The generation application execution section 501 generates data of a document, an image, and the like to be printed by the home complex machine 2 in accordance with the operation performed by a user on the terminal apparatus 5.

The driver execution section 502 generates print data based on the data generated by the generation application execution section 501. The print data includes data generated by the generation application execution section 501 and various commands for printing the data, and the like. The driver execution section 502 transmits the generated print data to the home complex machine 2 via the terminal communication section 51.

The browser execution section 503 accesses a predetermined address of the content management server 7 and receives display data for displaying a webpage via the terminal communication section 51. The browser execution section 503 displays the webpage on the terminal display section 53 in accordance with the display data via the terminal communication section 51.

Figure 3:
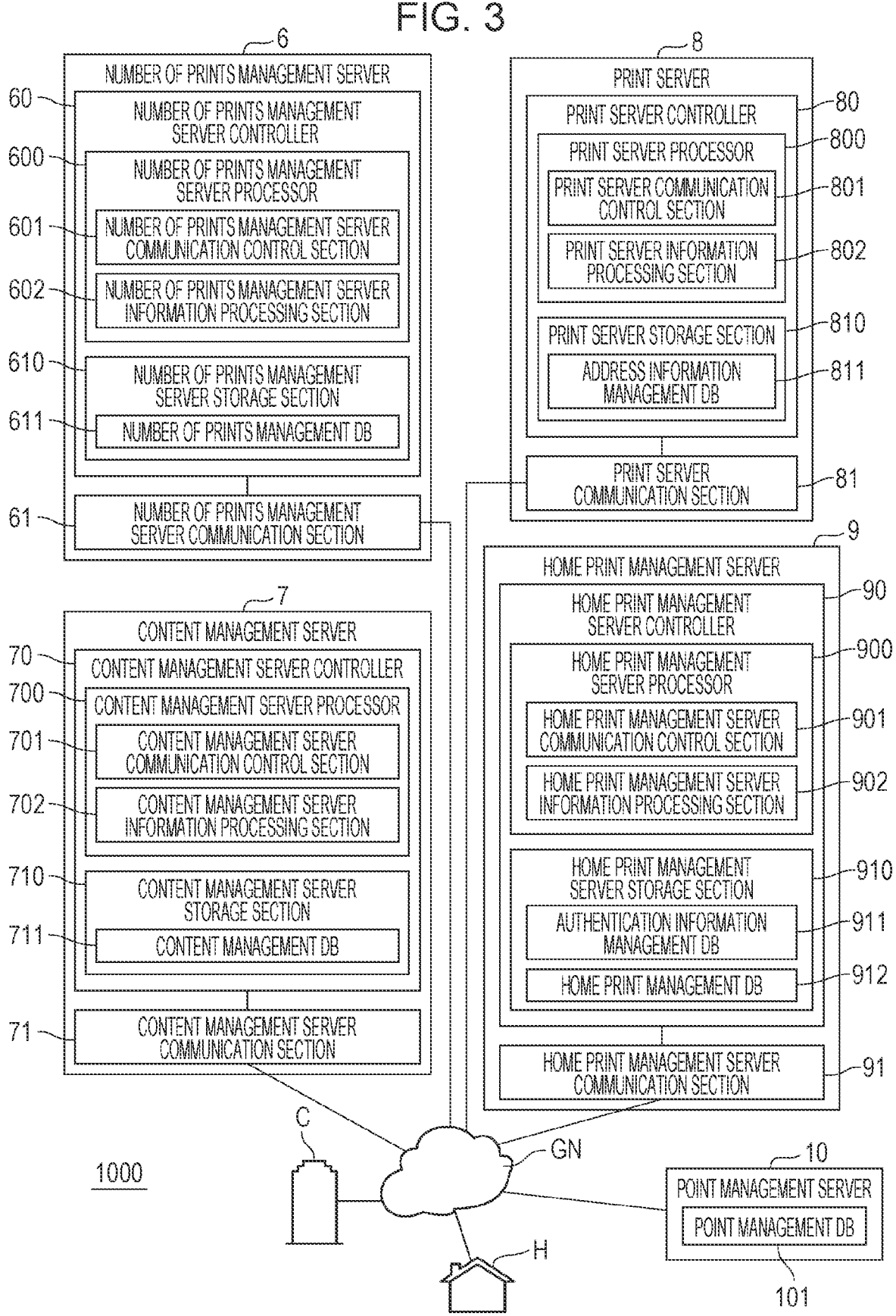
FIG. 3 is a diagram illustrating the configuration of each server.

FIG. 3 is a diagram illustrating the configurations of the number of prints management server 6, the content management server 7, the print server 8, the home print management server 9, and the point management server 10.

First, a description will be given of the number of prints management server 6. The number of prints management server 6 includes a number of prints management server controller 60 and a number of prints management server communication section 61.

The number of prints management server controller 60 includes a number of prints management server processor 600, which is a processor that executes a program, such as a CPU, an MPU or the like, and a number of prints management server storage section 610. The number of prints management server controller 60 controls each section of the number of prints management server 6 by causing the number of prints management server processor 600 to read a control program stored in the number of prints management server storage section 610 and execute the control program. The number of prints management server controller 60 functions as a number of prints management server communication control section 601 and a number of prints management server information processing section 602 by causing the number of prints management server processor 600 to execute the control program stored in the number of prints management server storage section 610.

The number of prints management server storage section 610 includes a memory that stores a program to be executed by the number of prints management server processor 600 and data to be processed by the number of prints management server processor 600. The number of prints management server storage section 610 stores a control program to be executed by the number of printed sheets management server processor 600, the number of prints management DB 611, and the various other kinds of data. The number of prints management server storage section 610 has a nonvolatile storage area. Also, the number of prints management server storage section 610 may have a volatile storage area and form a work area for the number of prints management server processor 600.

FIG. 4 is a diagram illustrating an example of the number of prints management DB 611. The number of prints management DB 611 is a database used for managing the number of printed sheets output by the complex machine provided to a contractor who signed a use contract of the printing service. In the present embodiment, the number of prints management DB 611 manages the number of printed sheets output by the company complex machine 1. Each record of the number of prints management DB 611 has a contractor ID 6111, a company complex machine ID 6112, complex machine printable number information 6113, and contractor printable number information 6114.

The contractor ID 6111 is identification information that identifies a contractor who signed a use contract of the printing service.

The company complex machine ID 6112 is identification information of the company complex machine 1.

The complex machine printable number information 6113 is information indicating a complex machine number of printable sheets. The complex machine number of printable sheets indicates the number of printable sheets to be printed by the complex machine provided to a contractor in the printing service. The complex machine number of printable sheets in the present embodiment indicates the number of printable sheets output by the company complex machine 1. The complex machine number of printable sheets corresponds to an example of the printable amount.

The contractor printable number information 6114 is information indicating a contractor number of printable sheets. The contractor number of printable sheets indicates the number of printable sheets printed by a contractor who signed a use contract of the printing service. The contractor number of printable sheets indicated by the contractor printable number information 6114 is the total of the complex machine number of printable sheets indicated by the complex machine printable number information 6113 corresponding to the same record R.

Referring back to FIG. 3, the number of prints management server communication section 61 is a communication interface including a component, such as a wireless circuit, an antenna, or the like, and communicates with a device connected to the global network GN in accordance with a predetermined communication standard.

As described above, the number of prints management server controller 60 functions as the number of prints management server control section 601 and the number of prints management server information processing section 602.

The number of prints management server communication control section 601 communicates with a device connected to the global network GN via the number of prints management server communication section 61.

The number of prints management server information processing section 602 performs information processing with a device connected to the global network GN as a client in accordance with a request or the like from a client.

Next, a description will be given of the content management server 7. The content management server 7 includes a content management server controller 70 and a content management server communication section 71.

The content management server controller 70 includes a content management server processor 700, which is a processor that executes a program, such as a CPU, an MPU or the like, and a content management server storage section 710. The content management server controller 70 controls each section of the content management server 7 by causing the content management server processor 700 to read a control program stored in the content management server storage section 710 and execute the control program. The content management server controller 70 functions as a content management server communication control section 701 and a content management server information processing section 702 by causing the content management server processor 700 to execute a control program stored in the content management server storage section 710.

The content management server storage section 710 includes a program to be executed by the content management server processor 700 and a memory that stores data to be processed by the content management server processor 700. The content management server storage section 710 stores a control program to be executed by the content management server processor 700, a content management DB 711, and the various other kinds of data. The content management server storage section 710 has a nonvolatile storage area. Also, the content management server storage section 710 may have a volatile storage area and form a work area for the content management server processor 700.

Figure 5:
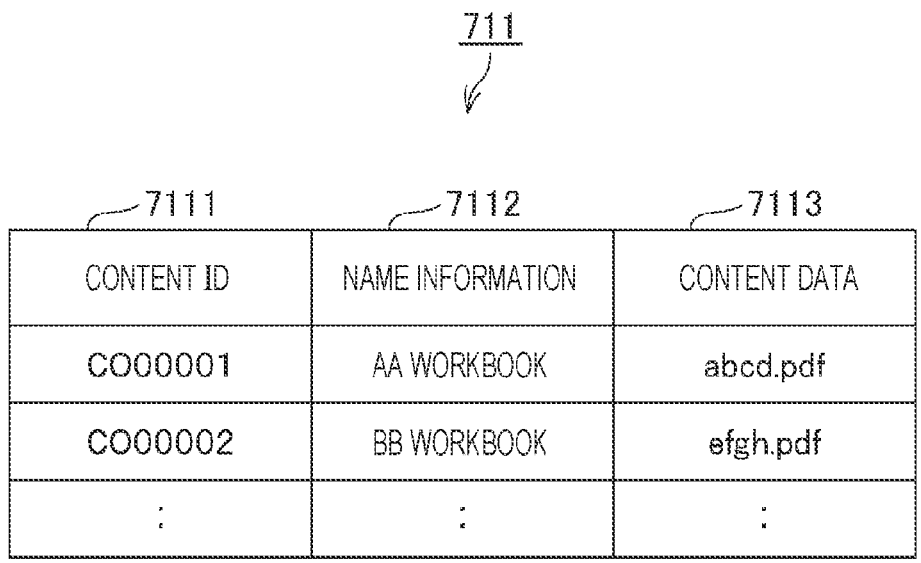
FIG. 5 is a diagram illustrating an example of a content management DB.

FIG. 5 is a diagram illustrating an example of the content management DB 711. The content management DB 711 is a database that manages content. Each record of the content management DB 711 has a content ID 7111, name information 7112, and content data 7113.

The content ID 7111 is identification information of content.

The name information 7112 is the information indicating a name of content.

The content data 7113 is the image data of the content identified by the content ID 7111. In FIG. 5, PDF (Portable Document Format) is exemplified as the data format of the content data 7113. In this regard, the data format of the content data 7113 is not limited to a PDF format and may be another format, such as a JPEG format or the like.

Referring back to FIG. 3, the content management server communication section 71 is a communication interface including a wireless circuit, an antenna, and the like and communicates with a device connected to the global network GN in accordance with a predetermined communication standard.

As described above, the content management server controller 70 functions as the content management server communication controller 701 and the content management server information processing section 702.

The content management server communication controller 701 communicates with a device connected to the global network GN via the content management server communication section 71.

The content management server information processing section 702 performs information processing with a device connected to the global network GN as a client in accordance with a request from the client.

Next, a description will be given of a print server 8. The print server 8 includes a print server controller 80 and a print server communication section 81.

The print server controller 80 includes a print server processor 800, which is a processor that executes a program, such as a CPU, an MPU or the like, and a print server storage section 810. The print server controller 80 functions as the print server communication control section 801 and the print server information processing section 802 to control each section of the print server 8 by causing the print server processor 800 to read a control program stored in the print server storage section 810 and execute the control program.

The print server storage section 810 includes a memory that stores a program to be executed by the print server processor 800 and data to be processed by the print server processor 800. The print server storage section 810 stores a control program to be executed by the print server processor 800, an address information management DB 811, and the various other kinds of data. The print server storage section 810 has a nonvolatile storage area. Also, the print server storage section 810 may have a volatile storage area and form a work area for the print server processor 800.

Figure 6:
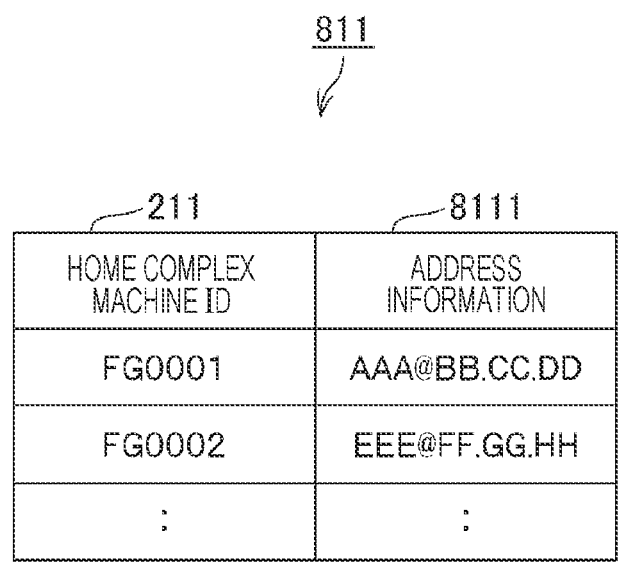
FIG. 6 is a diagram illustrating an example of an address information management DB.

FIG. 6 is a diagram illustrating an example of the address information management DB 811. The address information management DB 811 is a database that manages address information 8111 for communicating with the home complex machine 2. Each record of the address information management DB 811 has a home complex machine ID 211 and address information 8111.

The address information 8111 is the information indicating an address for transmitting print data to the home complex machine 2 indicated by the home complex machine ID 211 corresponding to the same record. The address information 8111 indicates, for example, an email address.

Referring back to FIG. 3, the print server communication section 81 is a communication interface including a component, such as a wireless circuit, an antenna, or the like, and communicates with a device connected to the global network GN in accordance with a predetermined communication standard.

As described above, the print server controller 80 functions as the print server communication control section 801 and the print server information processing section 802.

The print server communication control section 801 communicates with a device connected to the global network GN via the print server communication section 81.

The print server information processing section 802 performs information processing with a device connected to the global network GN as a client in accordance with a request from the client, or the like.

Next, a description will be given of the home print management server 9.

The home print management server 9 includes a home print management server controller 90 and a home print management server communication section 91. The home print management server controller 90 corresponds to an example of the controller.

The home print management server controller 90 includes a home print management server processor 900, which is a processor that executes a program, a CPU, an MPU, or the like, and a home print management server storage section 910. The home print management server controller 90 functions as a home print management server communication control section 901 and a home print management server information processing section 902 so as to control each section of the home print management server 9 by causing the home print management server processor 900 to read a control program stored in the home print management server storage section 910 and execute the control program.

The home print management server storage section 910 includes a memory that stores a program to be executed by the home print management server processor 900 and data to be processed by the home print management server processor 900. The home print management server storage section 910 stores a control program to be executed by the home print management server processor 900, an authentication information management DB 911, a home print management DB 912, and the various other kinds of data. The home print management server storage section 910 has a nonvolatile storage area. Also, the home print management server storage section 910 may have a volatile storage area and form a work area for the home print management server processor 900.

FIG. 7 is a diagram illustrating an example of the authentication information management DB 911. The authentication information management DB 911 is a database that manages information concerning user authentication. Each record of the authentication information management DB 911 has a user ID 514 and a password 9111 as authentication information.

The password 9111 is a password for authenticating the employee P indicated by the user ID 514.

FIG. 8 is a diagram illustrating an example of the home print management DB 912. The home print management DB 912 is a database that manages information concerning printing at the home H of the employee P. Each record of the home print management DB 912 has a contractor ID 6111, the user ID 514, and the home complex machine ID 211.

Referring back to FIG. 3, the home print management server communication section 91 is a communication interface including a component, such as a wireless circuit, an antenna, and the like, and communicates with a device connected to the global network GN in accordance with a predetermined communication standard.

As described above, the home print management server controller 90 functions as the home print management server communication control section 901 and the home print management server information processing section 902.

The home print management server communication control section 901 communicates with a device connected to the global network GN via the home print management server communication section 91.

The home print management server information processing section 902 performs information processing based on a request from the client, or the like with a device connected to the global network GN as a client.

Next, a description will be given of the point management server 10. The point management server 10 stores a point management DB 101, which is a database that manages points provided to an employee P. Each record of the point management DB 101 has a user ID 514 and point information indicating provided points.

Figure 9:
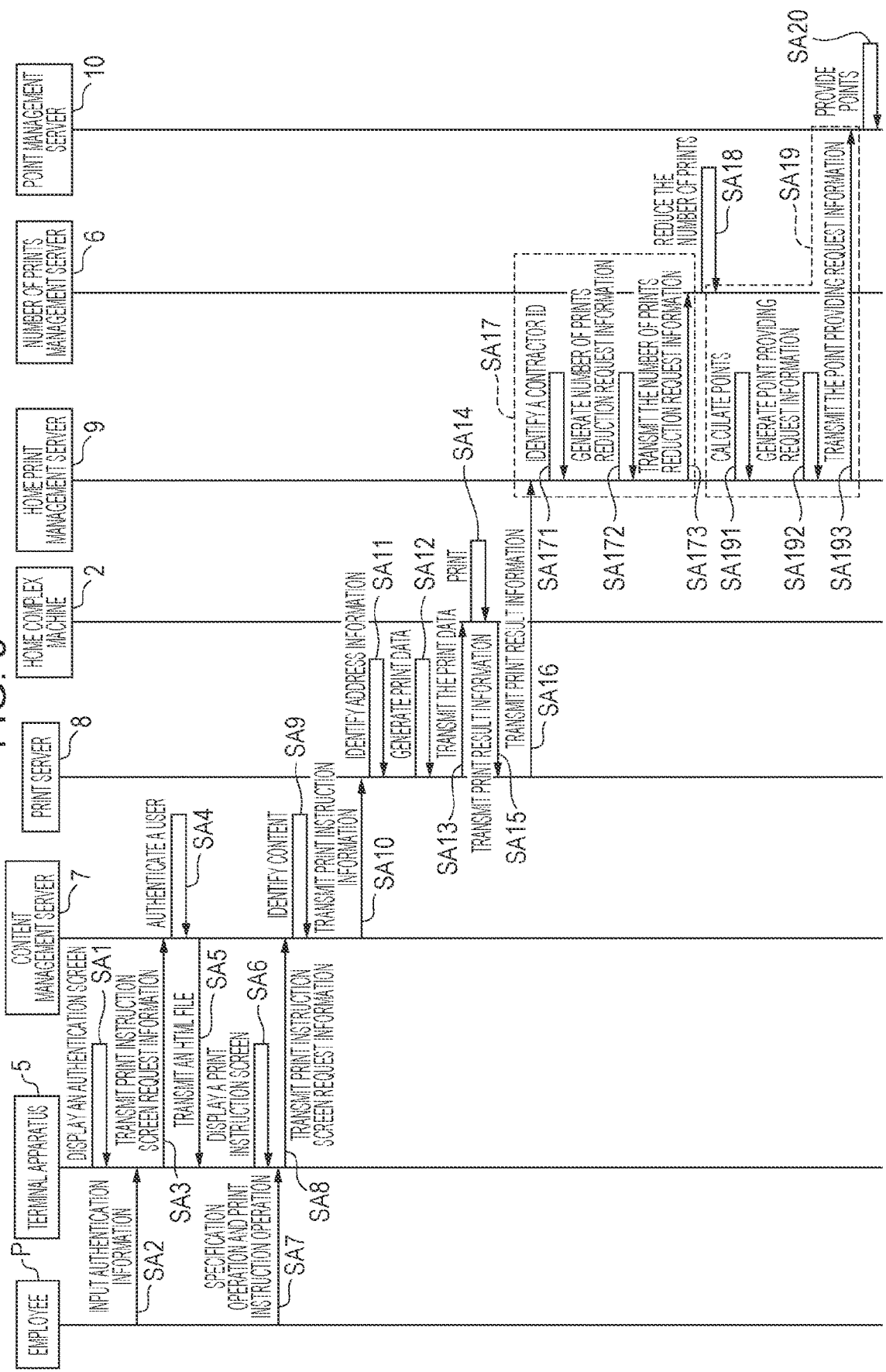
FIG. 9 is a flowchart illustrating the operation of the information processing system.

Next, a description will be given of the operation of the information processing system 1000. FIG. 9 is a sequence chart illustrating the operation of the information processing system 1000.

The browser execution section 503 of the terminal apparatus 5 causes the terminal display section 53 to display an authentication screen which is a screen related to user authentication (step SA1).

The employee P inputs authentication information in the terminal apparatus 5 based on the authentication screen displayed by the terminal apparatus 5 (step SA2). The authentication information includes a user ID 514 and a password 9111.

When authentication information is input, the browser execution section 503 transmits print instruction screen request information to the content management server 7 via the terminal communication section 51 (step SA3).

The print instruction screen request information is information that requests a print instruction screen. The print instruction screen is a screen for specifying content and giving a print instruction of the specified content. The print instruction screen includes a software button for displaying, for example, a list of name information 7112 for each content, performing the specification operation of content, and giving a print instruction of the specified content. The print instruction screen request information includes the authentication information input by the employee P.

When the content management server communication controller 701 receives print instruction screen request information, the content management server information processing section 702 of the content management server 7 performs user authentication based on the authentication information included in the print instruction screen request information (step SA4).

In step SA4, the content management server information processing section 702 inquires of the home print management server 9 whether or not the authentication information included in the print instruction screen request information is stored in the authentication information management DB 911. Next, when a response to the inquiry is a response that the authentication information included in the print instruction screen request information is stored in the authentication information management DB 911, the content management server information processing section 702 determines that the user authentication has succeeded. On the other hand, when a response to the inquiry is a response that the authentication information included in the print instruction screen request information is not stored in the authentication information management DB 911, the content management server information processing section 702 determines that the user authentication has failed.

When the content management server information processing section 702 determines that the user authentication was successful, the content management server communication controller 701 transmits an HTML file for displaying a print instruction screen to the terminal apparatus 5 via the content management server communication section 71 (step SA5). The HTML file for displaying the print instruction screen includes a pair of name information 7112 and a content ID 7111 stored in the content management DB 711 for each content.

In this regard, when the content management server information processing section 702 determines that the user authentication has failed, the content management server communication controller 701 does not transmit an HTML file for displaying a print instruction screen. In this case, the content management server communication controller 701 may transmit information indicating that the user authentication has failed to the terminal apparatus 5.

When the browser execution section 503 of the terminal apparatus 5 receives an HTML file for displaying a print instruction screen, the browser execution section 503 displays a print instruction screen by the terminal display section 53 (step SA6).

The employee P performs specification operation that specifies content and print instruction operation that gives a print instruction of the specified content on the print instruction screen (step SA7).

When the employee P performs the specification operation and the print instruction operation, the browser execution section 503 of the terminal apparatus 5 transmits print instruction execution request information to the content management server 7 via the terminal communication section 51 (step SA8).

The print instruction execution request information is information for requesting execution of a print instruction, and includes a content ID 7111 of the specified content, a home complex machine ID 515 stored in the terminal storage section 510, and a user ID 514 stored in the terminal storage section 510.

When the content management server 7 receives print instruction execution request information, the content management server information processing section 702 of the content management server 7 identifies content data 7113 corresponding to the content ID 7111 included in the print instruction execution request information (step SA9).

Next, the content management server communication controller 701 transmits print instruction information to the print server 8 via the content management server communication section 71 (step SA10).

The print instruction information includes the content data 7113 identified in step SA9, a home complex machine ID 515 included in the print instruction execution request information, and a user ID 514 included in the print instruction execution request information.

Next, when the print server communication control section 801 receives print instruction information, the print server information processing section 802 refers to the address information management DB 811, and identifies address information 8111 corresponding to the home complex machine ID 211 which is the same as the home complex machine ID 515 included in the print instruction information (step SA11).

The print server information processing section 802 of the print server 8 generates print data based on the content data 7113 included in the print instruction information received by the print server communication control section 801 (step SA12).

The print data generated in step SA12 includes the content data 7113 included in the print instruction information and a control command conforming to the command system of the home complex machine 2 indicated by the home complex machine ID 515 included in the print instruction information.

Next, the print server communication control section 801 transmits the print data generated in step SA12 to the home complex machine 2 via the print server communication section 81 based on the address information 8111 identified in step SA11 (step SA13).

When the complex machine communication control section 201 receives print data, the print control section 202 of the home complex machine 2 controls the print section 22 to perform printing based on the print data (step SA14).

When the print control section 202 ends printing, the complex machine communication control section 201 transmits printing result information indicating the printing results in step SA14 to the print server 8 (step SA15).

The printing results indicated by the printing result information indicate the number of printed sheets. The printing result information includes a home complex machine ID 211 stored in the complex machine storage section 210. In the present embodiment, the printing results indicated by the printing result information indicate the number of printed sheets, for example. However, the printing results indicated by the printing result information may include the other elements, such as a print mode indicating either color or monochrome, the amount of ink used, and the like in addition to the number of printed sheets.

When the print server communication control section 801 of the print server 8 receives printing result information from the home complex machine 2 via the print server communication section 81, the print server communication control section 801 transmits the received printing result information to the home print management server 9 via the print server communication section 81 (step SA16).

The home print management server controller 90 of the home print management server 9 performs reduction processing for reducing the number of printable sheets (printable amount) in accordance with the printing results based on the printing result information received from the print server 8 (step SA17).

In the reduction processing, the home print management server information processing section 902 refers to the home print management DB 912 and identifies a contractor ID 6111 corresponding to the home complex machine ID 211 included in the printing result information received by the home print management server communication control section 901 (step SA171).

Next, the home print management server information processing section 902 generates number of printed sheets reduction request information (step SA172).

The number of printed sheets reduction request information is the information that requests reduction of the contractor number of printable sheets, and includes an identified contractor ID 6111 and the printing result information received from the print server 8. In this regard, the contractor number of printable sheets is the total of the complex machine number of printable sheets, and thus reduction of the contractor number of printable sheets corresponds to an example of reduction of the complex machine number of printable sheets.

Next, the home print management server communication control section 901 transmits the number of printed sheets reduction request information generated by the home print management server information processing section 902 to the number of prints management server 6 (step SA173).

The number of prints management server information processing section 602 of the number of prints management server 6 reduces number of printed sheets based on the number of printed sheets reduction request information received by the number of prints management server communication control section 601 (step SA18).

Specifically, the number of prints management server information processing section 602 identifies a record having the contractor ID 6111 included in the number of printed sheets reduction request information from the number of prints management DB 611. Next, the number of prints management server information processing section 602 reduces the contractor number of printable sheets indicated by the contractor printable number information 6114 of the identified record by the number of printed sheets indicated by the printing result information included in the number of printed sheets reduction request information. Next, the number of prints management server information processing section 602 reduces the complex machine number of printable sheets for one or a plurality of pieces of the complex machine printable number information 6113 that is associated with the contractor ID 6111 as much as the reduced contractor printable number of sheets.

Referring back to the sequence diagram in FIG. 9, the home print management server controller 90 performs point providing processing for providing points in accordance with the printing results to the account of the user in a predetermined points service based on the printing result information from the print server 8 (step SA19).

In the point providing processing, the home print management server information processing section 902 calculates points in accordance with the number of printed sheets indicated by the printing result information received by the home print management server communication control section 901 (step SA191).

Next, the home print management server information processing section 902 generates point providing request information (step SA192). The point providing request information to be generated includes information indicating the points calculated in step SA191 and a user ID 514. The user ID 514 included in the point providing request information is the user ID 514 corresponding to the home complex machine ID 211 included in the printing result information received from the print server 8 in the home print management DB 912.

Next, the home print management server communication control section 901 transmits the point providing request information generated by the home print management server information processing section 902 to the point management server 10 (step SA193).

The point management server 10 increases the points indicated by the point information stored in the point management DB 101 based on the received point providing request information. More specifically, the point management server 10 identifies a record having a user ID 514 included in the received point providing request information in the point management DB 101. The point management server 10 adds the points indicated by the received point providing request information to the points indicated by the point information of the identified record.

Next, a description will be given of the operation of the information processing system 1000 when printing is performed based on print data generated by the printer driver 512.

With the printer driver 512, it is possible to input either business printing or private printing for the use of the home complex machine 2. In the description of the printing based on the print data generated by the printer driver 512, a description will be given separately of the case where business printing is input and the case where private printing is input. The business printing corresponds to an example of the first use. The private printing corresponds to an example of the second use.

Figure 10:
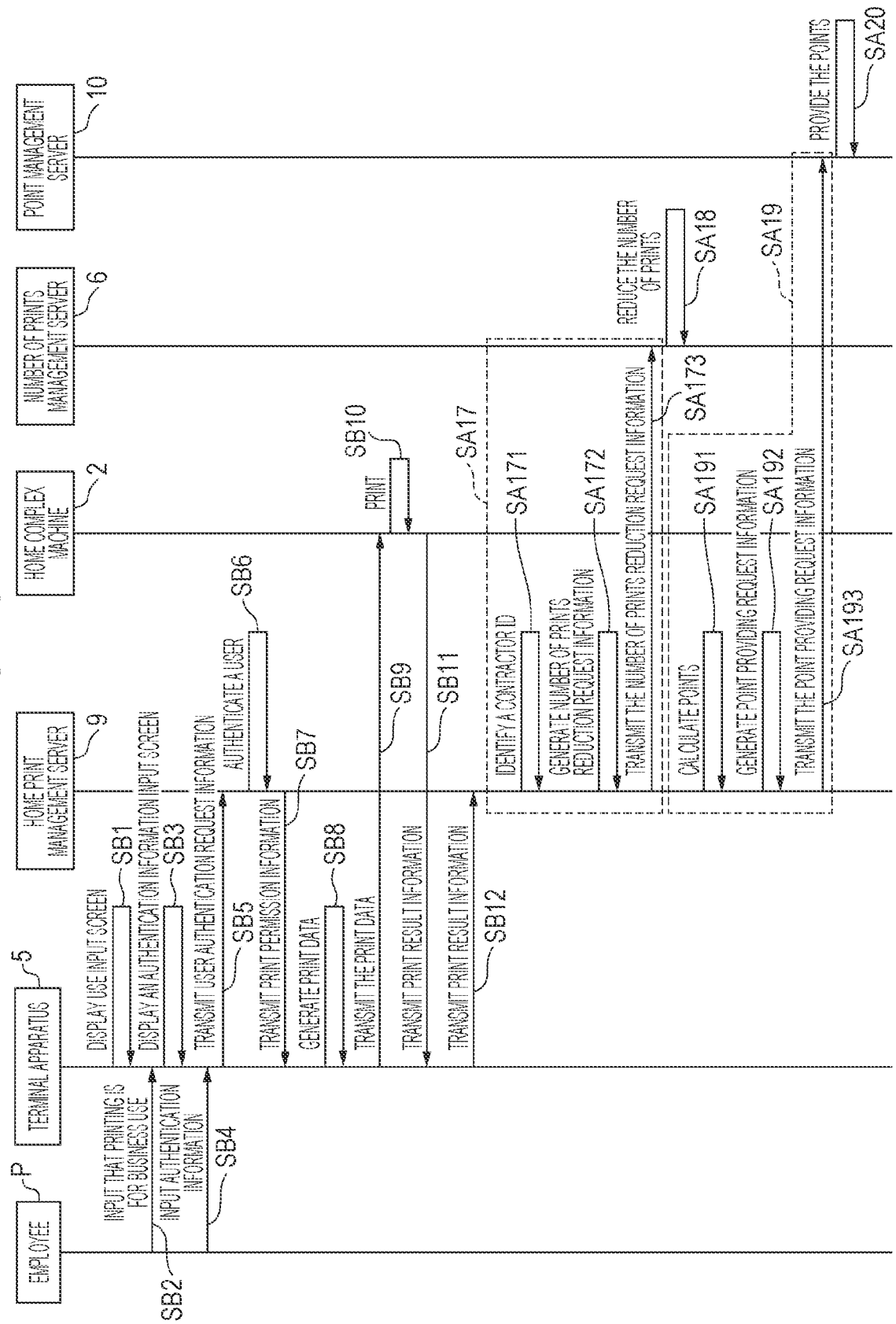
FIG. 10 is a flowchart illustrating the operation of the information processing system.

First, a description will be given of the operation of the information processing system 1000 when business printing is input. FIG. 10 is a sequence chart illustrating the operation of the information processing system 1000. In FIG. 10, the same step number is given to the same step as that in the sequence chart illustrated in FIG. 9, and the detailed description will be omitted.

The driver execution section 502 of the terminal apparatus 5 displays a use input screen for inputting the use of the home complex machine 2 onto the terminal display section 53 (step SB1).

When the employee P inputs business printing for the use of the home complex machine 2 based on the use input screen displayed by the terminal apparatus 5, and the driver execution section 502 receives business printing for the use (step SB2), the driver execution section 502 displays an authentication information input screen for inputting authentication information on the terminal display section 53 (step SB3).

The employee P inputs authentication information to the terminal apparatus 5 based on the authentication information input screen displayed by the terminal apparatus 5. When the driver execution section 502 receives the authentication information (step SB4), the driver execution section 502 transmits user authentication request information to the home print management server 9 via the terminal communication section (step SB5).

The user authentication request information is the information for requesting user authentication and includes the authentication information input by the employee P.

When the home print management server control section 901 receives user authentication request information, the home print management server information processing section 902 of the home print management server 9 performs user authentication based on the authentication information included in the authentication request information (step SB6).

In step SB6, when the authentication information included in the user authentication request information is stored in the authentication information management DB 911 as a record, the home print management server information processing section 902 determines that the user authentication has succeeded. On the other hand, in step SB6, when the authentication information included in the user authentication request information is not stored in the authentication information management DB 911 as a record, the home print management server information processing section 902 determines that the user authentication has failed.

When the home print management server information processing section 902 has determined that the user authentication has succeeded, the home print management server communication control section 901 transmits print permission information to the terminal apparatus 5 via the home print management server communication section 91 (step SB7).

In this regard, when the home print management server information processing section 902 has determined that the user authentication has failed, the home print management server communication control section 901 does not transmit print permission information. In this case, the home print management server communication control section 901 may transmit information indicating that the user authentication has failed to the terminal apparatus 5.

When the driver execution section 502 of the terminal apparatus 5 receives print permission information via the terminal communication section 51, the driver execution section 502 generates print data generated by the generation application execution section 501 (step SB8) and transmits the generated print data to the home complex machine 2 via the terminal communication section 51 (step SB9).

When the complex machine communication control section 201 receives print data, the printing control section 202 of the home complex machine controls the print section 22 to perform printing based on the print data (step SB10).

When the printing control section 202 ends printing, the complex machine communication control section 201 transmits printing result information indicating the printing results in step SB10 to the terminal apparatus 5 (step SB11).

The printing result information transmitted in step SB11 includes a home complex machine ID 211 stored in the complex machine storage section 210.

When the driver execution section 502 of the terminal apparatus 5 receives printing result information from the home complex machine 2 via the terminal communication section 51, the driver execution section 502 transmits the received printing result information to the home print management server 9 via the terminal communication section 51 (step SB12).

The home print management server 9 performs reduction processing and point providing processing based on the printing result information received from the terminal apparatus 5.

Figure 11:
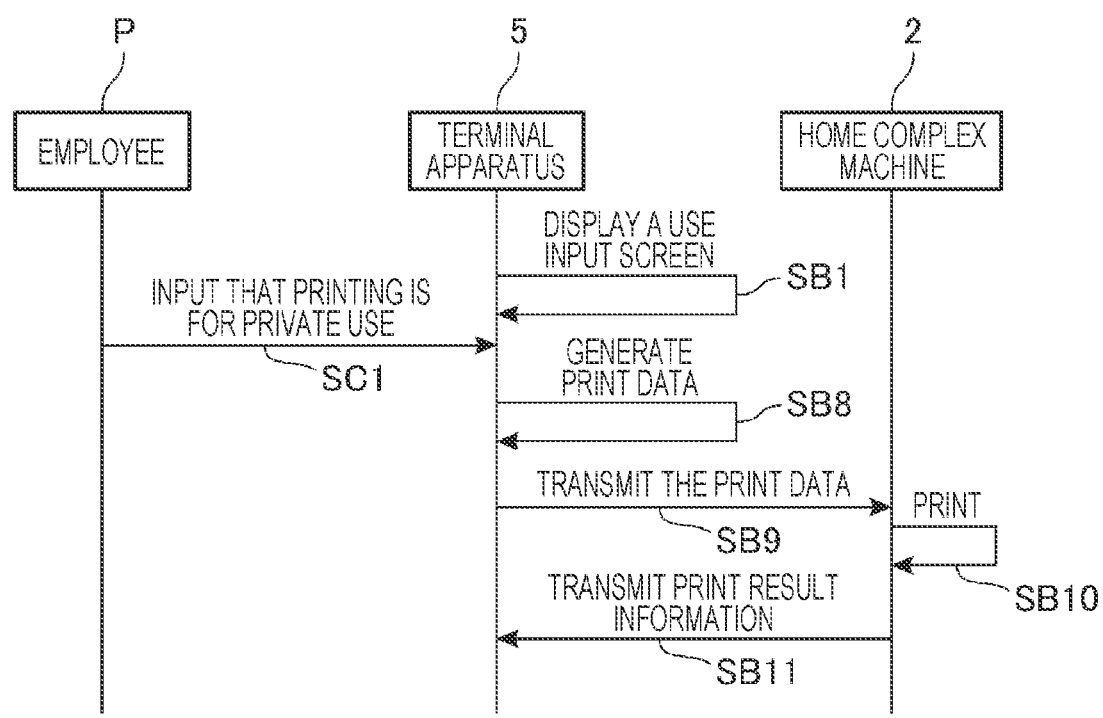
FIG. 11 is a flowchart illustrating the operation of the information processing system.

Next, a description will be given of the operation of the information processing system 1000 when private printing is input. FIG. 11 is a sequence chart illustrating the operation of the information processing system 1000. In FIG. 11, the same step number is given to the same step as that illustrated in the sequence chart illustrated in FIG. 10, and the detailed description will be omitted.

The employee P inputs that the use of the home complex machine 2 is private printing based on the use input screen displayed by the terminal apparatus 5. When the driver execution section 502 receives the input of private printing (step SC1), the driver execution section 502 generates print data (step SB8).

As is apparent from the comparison between FIG. 10 and FIG. 11, when the use of the home complex machine 2 is business printing, the printing result information is transmitted to the home print management server 9, and the home print management server 9 performs the reduction processing and the point providing processing. On the other hand, when the use of the home complex machine 2 is private printing, the printing result information is not transmitted to the home print management server 9. Accordingly, when the use of the home complex machine 2 is private printing, the home print management server 9 does not perform the reduction processing and the point providing processing. Next, descriptions will be given of a plurality of variations of the embodiment described above.

First Variation

In the embodiment described above, the home print management server 9 performs point providing processing every time the home print management server 9 receives printing result information. A home print management server 9 according to a first variation performs point providing processing at a predetermined period, for example, per month.

In the first variation, the home print management server controller 90 of the home print management server 9 performs the following processing for each home complex machine 2. That is to say, the home print management server information processing section 902 cumulatively counts the number of printed sheets based on the printing result information. When the time comes to perform point providing processing, the home print management server information processing section 902 calculates the points in accordance with the counted number of printed sheets. The home print management server information processing section 902 transmits the point providing request information including the information on the calculated points to the point management server 10. Next, after the home print management server communication control section 901 transmits the point providing request information, the home print management server controller 90 changes the counted number of printed sheets to zero.

Second Variation

In the above-described embodiment and variation, points in accordance with the number of printed sheets are given to the employee P. In the second variation, points corresponding to the price of the consumables are given to the employee P of the home complex machine 2. In the description of the second variation, an example in which the consumables of the home complex machine 2 is ink is displayed.

The printing results indicated by the printing result information according to the second variation include an amount of ink used. In the second variation, the home print management server controller 90 of the home print management server 9 performs the following processing for each home complex machine 2. That is to say, the home print management server information processing section 902 cumulatively counts the amount of ink used based on the printing result information. When the counted amount of ink used becomes equal to or larger than a predetermined value, which means ink shortage, the home print management server information processing section 902 generates point providing request information including information on the points corresponding to the price of ink or an ink cartridge. The home print management server communication control section 901 transmits the point providing request information to the point management server 10. Next, after the home print management server communication control section 901 transmits the point providing request information, the home print management server information processing section 902 changes the counted amount of ink used to zero.

In this regard, in the second variation, ink is exemplified as consumables of the home complex machine 2. However, the consumables of the home complex machine 2 are not limited to ink and may be toner or a print medium. For example, when the consumables is a print medium, the home print management server information processing section 902 cumulatively counts the number of printed sheets based on the printing result information. When the counted number of printed sheets becomes equal to or larger than a predetermined value, which means print medium shortage, the home print management server information processing section 902 generates point providing request information including the information on the points corresponding to the price of the print medium. The home print management server communication control section 901 transmits the point providing request information to the point management server 10. Next, after the home print management server communication control section 901 transmits the point providing request information, the home print management server information processing section 902 changes the counted number of printed sheets to zero.

As described above, the information processing system 1000 includes a company complex machine 1 to be a target of printing service in the target complex machine printing service, a home complex machine 2 not to be a target of the printing service, a number of prints management server 6 that manages the complex machine number of printable sheets, which is the number of printable sheets output by the company complex machine 1, and a home print management server 9 that performs reduction processing for reducing the complex machine number of printable sheets managed by the number of prints management server 6 based on the printing results performed by the home complex machine 2 when the home complex machine 2 has performed printing, and point providing processing for providing points in accordance with the printing results of the home complex machine 2 to the employee P.

Thereby, since points in accordance with the printing results of the home complex machine 2 are given to the employee P, when the employee P performs printing by using a home complex machine 2 that is not the target for the printing service while working at home, and the like, it is possible to reduce the burden of the printing cost imposed on the employee P. Also, in exchange for reducing the complex machine number of printable sheets in the printing service, points are provided. Accordingly, it is possible for the complex machine not targeted for the service to easily use printing that does not cause a cost burden in addition to the cost of the printing service.

When the use of the home complex machine 2 by the employee P is business printing, the home print management server 9 performs the reduction processing and the point providing processing. When the use of the home complex machine 2 by the employee P is private printing, the home print management server 9 does not perform the reduction processing and the point providing processing.

Thereby, when the use of the home complex machine 2 is business printing, the reduction processing and the point providing processing are performed. Accordingly, when business printing is performed by using the home complex machine 2 while working at home, and the like, it is possible to reduce the printing cost burden imposed on the employee P.

The information processing system 1000 includes a terminal apparatus 5 that transmits print data to the home complex machine 2 and receives printing result information for the transmitted print data from the home complex machine 2. The terminal apparatus 5 receives input, from the employee P, which specifies whether the use of the home complex machine 2 is business printing or private printing. When input of business printing is received, the terminal apparatus 5 transmits printing result information indicating the printing results of the home complex machine 2 to the home print management server 9. When the home print management server 9 receives printing result information from the terminal apparatus 5, the home print management server 9 performs the reduction processing and the point providing processing based on the printing results of the home complex machine 2 indicated by the printing result information.

Thereby, when the printing based on the print data transmitted by the terminal apparatus 5 is business printing, it is possible to reduce the printing cost burden imposed on the employee P. Accordingly, when the content stored by the terminal apparatus 5 is business printing, it is possible to reduce the printing cost burden imposed on the employee P.

The information processing system 1000 includes the content management server 7 that manages content. When the home complex machine 2 prints content managed by the content management server 7, the content management server 7 determines that the use of the home complex machine 2 by the employee P is business printing and performs the reduction processing and the point providing processing.

Thereby, when the company C sets content managed by the content management server 7 as business content, it is possible for the home complex machine 2 to perform business printing even when the terminal apparatus 5 does not store the business content. Accordingly, it is possible to increase security of the content when the home complex machine 2 performs business printing while working at home, or the like, and to reduce the printing cost burden imposed on the employee P.

In the point providing processing, when the amount of consumables used by the home complex machine 2 becomes equal to or larger than a predetermined value, the content management server 7 provides points corresponding to the price of the consumables.

As a result, it becomes possible to provide points at the timing when the employee P wants to purchase the consumables, and thus it is possible to increase convenience for the employee P.

The company complex machine 1 is a complex machine provided to the company C that has signed a use contract of the printing service. The home complex machine 2 is a complex machine used by the employee P who has an employment relationship with the company C and not provided for the printing service.

Thereby, since points in accordance with the printing results of the home complex machine 2 are given to the employee P, when the employee P performs printing by using the home complex machine 2 not targeted for the printing service while working at home, or the like, it is possible to reduce the printing cost burden imposed on the employee P. Also, in the information processing system 1000, the complex machine number of printable sheets is reduced, and thus it is possible to process the printing by the home complex machine 2 used by the employee P as the use of the printing service contracted by the company C.

It is possible for the home print management server 9 to communicate with the number of prints management server 6 that manages the complex machine number of printable sheets of the company complex machine 1 to be a target for the printing service using the target complex machine. The home print management server 9 includes a home print management server controller 90 that performs, when the home complex machine 2, which is not targeted for the printing service, performs printing, the reduction processing for reducing the complex machine number of printable sheets based on the printing results of the home complex machine 2 and the point providing processing for providing points in accordance with the printing results of the home complex machine 2 to the employee P.

As a result, it is possible to obtain the same advantages as those of the information processing system 1000 described above.

The above-described embodiment and variations are only some aspects of the present disclosure. It is possible to vary and apply the embodiment in any form within the scope of the present disclosure.

In the above-described embodiment and variations, a serial ink jet method is exemplified as the printing method of the company complex machine 1 and the home complex machine 2. However, a line ink jet method may be used for the printing method of these complex machines. Also, the printing method of these complex machines is not limited to an ink jet method, and the other printing methods may be used. Also, a complex machine has been exemplified for the first printer and the second printer. However, the first printer and the second printer are not limited to a complex machine, and a printer not having a scan function, or the like may be used. Also, the company complex machine 1 and the home complex machine 2 may be apparatuses having more various functions, such as a facsimile function, and the like.

In the above-described embodiment and variations, the company C is exemplified as a contractor who has signed a use contract of the printing service, and the employee P is exemplified as a user of the second printer. However, the contractor is not limited to the company C. Also, the user of the second printer is not limited to the employee P. The contractor has to be only an entity that has signed a use contract of the printing service, and the user of the second printer has to be only a person who has a predetermined relationship with the entity. For example, the contractor may be an entity of a school or a cram school. When the contractor is a school or a cram school, examples of the user of the second printer include a teacher and a student who have an enrollment registration relationship with the school or the cram school.

In the above-described embodiment and variation, in the printing service, a complex machine is provided to a contractor who has signed a use contract of the printing service, and it is possible for the provided complex machine to print a predetermined number of sheets by at a flat rate for a certain period. However, providing a complex machine may not be included in the service. Also, when the number of printed sheets exceeds the printable amount by a flat rate, the printing service may be charged at a measured rate of the excess amount. In this case, the reduction processing and the point providing processing may be performed only in the range of the flat rate charging.

In the above-described embodiment and variations, business printing has been given as an example of the first use, and private printing has been given as an example of the second use. However, the first use is not limited to business printing. The first use and the second use ought to be different from each other. For example, when the contractor is a school, and the user of the second printer is a student, it is possible to assume that the first use is printing for home learning, and the second use is private printing.

The home print management server 9 may convert the calculated points into the other second points and may perform point providing processing for giving the converted second points. In a case of this configuration, the information processing system 1000 includes a second point management server that manages the second points. The home print management server 9 performs the point providing processing by using the second point management server as the communication target. Also, the home print management server 9 may convert the calculated points into electronic money, and perform the processing for giving electronic money as the point providing processing. In a case of this configuration, the information processing system 1000 includes an electronic money management server that manages electronic money. The home print management server 9 performs point providing processing for giving electronic money by using the electronic money management server as the communication target.

In the above-described embodiment and variations, the number of prints management server 6 was exemplified as the first management apparatus and the printable amount management apparatus. However, the first management apparatus and the printable amount management apparatus are not limited to a server apparatus that manages the number of printable sheets. The first management apparatus and the printable amount management apparatus may be a server apparatus that manages the other printable amounts, such as an ink usable amount, which is a usable amount of ink, or the like. When the first management apparatus and the printable amount management apparatus manages a printable amount other than the number of printable sheets, the printing results indicated by the printing result information indicates an element corresponding to the target managed by the first management apparatus and the printable amount management apparatus. For example, when the first management apparatus and the printable amount management apparatus manages an ink usable amount, printing results indicated by the printing result information indicates the amount of ink used.

In the above-described embodiment and variations, user authentication is performed by the content management server 7 inquiring of the home print management server 9. However, the content management server 7 may store the authentication information management DB 911 and perform user authentication based on the authentication information management DB 911.

Also, the functions of the terminal controller 50, the complex machine controller 20, the number of prints management server controller 60, the content management server controller 70, the print server controller 80, and the home print management server controller 90 may be realized by a plurality of processors or semiconductor chips.

Also, each section illustrated in FIG. 2 and FIG. 3 is an example, and a specific implementation form is not limited in particular. That is to say, it is not necessary that each section needs to be implemented in a separately corresponding hardware. Of course, it is possible to realize the function of each section by one processor executing a program. Also, in the embodiment described above, a part of the functions realized by software may be implemented by hardware, or a part of the functions realized by hardware may be implemented by software. In addition, it is possible to change the detailed configuration of the other each section of the home complex machine 2, the terminal apparatus 5, and each server apparatus in any way within the spirit and the scope of the present disclosure.

Also, the step units of the operation illustrated in FIG. 9 to FIG. 11 are divided in accordance with the major processing contents to facilitate understanding of the operation of each apparatus of the information processing system 1000. The present disclosure is not limited by the way of dividing a processing unit and the name of a processing unit. The operation may be further divided into many step units in accordance with the processing contents. Also, one step unit may be divided into units so as to include further processing. Also, the order of the steps may be suitably changed within a range that causes no problem to the spirit of the present disclosure.

What is claimed is:

1. An information processing system for providing a printing service using a target printer, comprising:
   a first printer to be a target for the printing service, wherein the first printer is a printer provided to a contractor who signed a use contract of the printing service;
   a second printer not to be the target for the printing service, wherein the second printer is different from the first printer;
   a first management apparatus configured to manage a printable amount, the printable amount being an amount of prints printable by the first printer in the printing service; and
   when printing is performed by the second printer, a second management apparatus configured to:
      identify a contractor ID of the contractor based on printing result information of the second printer, wherein the printing result information indicates printing results of the second printer;
      perform reduction processing, for reducing the printable amount managed by the first printer for the identified contractor ID, based on the printing results of the second printer, wherein the printable amount of the first printer is reduced by a number of printed sheets indicated by the printing results of the second printer; and
      perform point providing processing for providing points in accordance with the printing results of the second printer to a user of the second printer.

2. The information processing system according to claim 1, wherein
   when a purpose of use of the second printer by the user is a first use, the second management apparatus performs the reduction processing and the point providing processing; and
   when the purpose of use of the second printer by the user is a second use, the second management apparatus does not perform the reduction processing and the point providing processing.

3. The information processing system according to claim 2, further comprising:
   a terminal apparatus configured to transmit print data to the second printer and to receive the printing result information indicating printing results of the second printer for transmitted print data from the second printer, wherein
      the terminal apparatus receives, input of whether the purpose of use of the second printer is the first use or the second use, from the user,
      when the terminal apparatus receives input of the first use, the terminal apparatus transmits the printing result information to the second management apparatus, and
      when the second management apparatus receives the printing result information from the terminal apparatus, the second management apparatus performs the reduction processing and the point providing processing based on the printing results of the second printer indicated by the printing result information.

4. The information processing system according to claim 2, further comprising:
   a third management apparatus that manages content, wherein
      when the second printer prints the content managed by the third management apparatus, the second management apparatus determines that the purpose of use of the second printer by the user is the first use and performs the reduction processing and the point providing processing.

5. The information processing system according to claim 1, wherein
   when an amount of consumables used by the second printer becomes equal to or larger than a predetermined value, the second management apparatus provides points corresponding to a price of the consumables in the point providing processing.

6. The information processing system according to claim 1, wherein
   the second printer is a printer to be used by the user having a predetermined relationship with the contractor and is not provided as a part of the printing service.

7. In a printing service using a target printer, a management apparatus communicable with a printable amount management apparatus managing a printable amount of a first printer to be a target for the printing service, the management apparatus comprising:
  when printing is performed by a second printer not to be the target for the printing service, a controller configured to:
    identify a contractor ID of a contractor of the first printer based on printing result information of the second printer, wherein
      the first printer is a printer provided to the contractor who signed a use contract of the printing service,
      the printing result information indicates printing results of the second printer, and
      the second printer is different from the first printer;
    perform reduction processing, for reducing the printable amount managed by the printable amount management apparatus for the identified contractor ID, based on the printing results of the second printer, wherein the printable amount of the first printer is reduced by a number of printed sheets indicated by the printing results of the second printer; and
    perform point providing processing for providing points in accordance with the printing results of the second printer to a user of the second printer.

* * * * *